(12) United States Patent
Commis et al.

(10) Patent No.: US 11,447,239 B2
(45) Date of Patent: Sep. 20, 2022

(54) AIRCRAFT WING AND WING TIP DEVICE

(71) Applicant: Airbus Operations Limited, Bristol (GB)

(72) Inventors: Ben Commis, Bristol (GB); Neil John Lyons, Bristol (GB)

(73) Assignee: Airbus Operations Limited, Bristol (GB)

( * ) Notice: Subject to any disclaimer, the term of this patent is extended or adjusted under 35 U.S.C. 154(b) by 523 days.

(21) Appl. No.: 16/391,878

(22) Filed: Apr. 23, 2019

(65) Prior Publication Data

US 2019/0329874 A1 Oct. 31, 2019

(30) Foreign Application Priority Data

Apr. 25, 2018 (GB) ..................................... 1806787

(51) Int. Cl.
*B64C 23/06* (2006.01)
*B64C 3/14* (2006.01)
*B64F 5/00* (2017.01)

(52) U.S. Cl.
CPC .............. *B64C 23/069* (2017.05); *B64C 3/14* (2013.01); *B64F 5/00* (2013.01)

(58) Field of Classification Search
CPC .... B64C 23/069; B64C 23/072; B64C 23/076
See application file for complete search history.

(56) References Cited

U.S. PATENT DOCUMENTS

| 3,411,738 | A | * | 11/1968 | Sargent | ..................... B64C 3/00 244/199.2 |
| 4,245,804 | A | * | 1/1981 | Ishimitsu | .............. B64C 23/069 244/91 |
| 5,275,358 | A | | 1/1994 | Goldhammer et al. | |
| 5,407,153 | A | * | 4/1995 | Kirk | ...................... B64C 23/069 244/199.4 |
| 5,634,613 | A | * | 6/1997 | McCarthy | ............. B64C 23/069 244/199.1 |
| 6,089,502 | A | * | 7/2000 | Herrick | ................. B64C 23/069 244/35 R |
| 6,578,798 | B1 | * | 6/2003 | Dizdarevic | ........... B64C 23/069 244/199.1 |

(Continued)

FOREIGN PATENT DOCUMENTS

| EP | 3 284 667 | 2/2018 |
| WO | 96/03215 | 2/1996 |

OTHER PUBLICATIONS

European Search Report cited in EP 19168903.3 dated Sep. 17, 2019, 7 pages.

(Continued)

*Primary Examiner* — Joshua J Michener
*Assistant Examiner* — Michael B. Kreiner
(74) *Attorney, Agent, or Firm* — Nixon & Vanderhye P.C.

(57) ABSTRACT

An aircraft wing (2) including a main wing (3) and a wing tip device (4) at the tip of the main wing (3), wherein the wing tip device (4) has a variation of leading edge droop with respect to unrolled span-wise position such that flow separation on the wing tip device (4) first occurs in an outboard region (O) of the wing tip device (4). The leading edge droop of the wing tip device (4) may be a maximum in an outboard region (O) of the wing tip device.

24 Claims, 8 Drawing Sheets

(56) References Cited

U.S. PATENT DOCUMENTS

| | | | | |
|---|---|---|---|---|
| 8,651,427 B1* | 2/2014 | Malachowski | ....... | B64C 23/065 244/199.4 |
| 2004/0061029 A1* | 4/2004 | McCarthy | ............. | B64C 23/072 244/199.4 |
| 2009/0256029 A1* | 10/2009 | Malachowski | ....... | B64C 23/069 244/199.4 |
| 2011/0024573 A1* | 2/2011 | Kirk | ...................... | B64C 23/069 244/199.4 |
| 2011/0192937 A1* | 8/2011 | Buescher | .............. | B64C 23/069 244/199.4 |
| 2014/0117166 A1* | 5/2014 | Campbell, Jr. | ....... | B64C 23/069 244/199.4 |
| 2015/0028160 A1* | 1/2015 | Roncz | ................... | B64C 23/069 244/199.4 |
| 2015/0151831 A1 | 6/2015 | Guida | | |
| 2016/0009378 A1* | 1/2016 | Guida | ................... | B64C 23/076 244/199.4 |
| 2017/0334557 A1* | 11/2017 | Alber | ........................ | B64C 7/02 |

OTHER PUBLICATIONS

Combined Search and Examination Report for GB 1806787.6 dated Oct. 23, 2018, 5 pages.

* cited by examiner

AIRCRAFT WING AND WING TIP DEVICE

RELATED APPLICATION

This application claims priority to United Kingdom patent application GB 1806787.6 filed Apr. 25, 2018, which is incorporated by reference in its entirety.

BACKGROUND OF THE INVENTION

The present invention relates to an aircraft wing having a wing tip device and to a wing tip device itself. The present invention also relates to an aircraft having an aircraft wing with a wing tip device. The present invention also relates to a method of design and a method of manufacture of a wing tip device, aircraft wing and aircraft.

Wing tip devices are used to improve the efficiency of fixed wing aircraft, predominantly by reducing lift induced drag. Although this may increase the profile drag, the overall lift to drag ratio is increased. This increases fuel efficiency, which is particularly important with passenger aircraft.

Wing tip devices are relatively complex structures to design and build. They are primarily designed to improve high speed performance. However, they can provide suboptimal low speed performance and handling characteristics.

The present invention seeks to address or mitigate at least some of the above mentioned problems. Alternatively, or additionally, the present invention seeks to provide an improved aircraft wing comprising a wing tip device. Alternatively, or additionally, the present invention seeks to provide an improved wing tip device for use on an aircraft wing. Alternatively, or additionally, the present invention seeks to provide an improved aircraft comprising a wing that has a wing tip device. Alternatively, or additionally, the present invention seeks to provide an improved method of designing a wing tip device, aircraft wing or aircraft having a wing tip device. Alternatively, or additionally, the present invention seeks to provide an improved method of manufacture of a wing tip device, aircraft wing or aircraft having a wing tip device.

SUMMARY OF THE INVENTION

According to a first aspect of the invention there is provided an aircraft wing comprising a main wing and a wing tip device at the tip of the main wing, wherein the wing tip device has a variation of leading edge droop with respect to unrolled span-wise position such that flow separation on the wing tip device first occurs in an outboard region of the wing tip device.

Varying the leading edge droop of the wing tip device such that flow separation on the wing tip device first occurs in an outboard region of the wing tip device is advantageous in that it may extend the period between the onset of flow separation and the point at which the flow on the wing tip device becomes fully separated.

This may result in a low speed drag improvement extending over a larger part of the aircraft operating flight envelope together with more benign and symmetrical handling qualities at low speed.

It may also increase the angle of attack at which flow separation begins to occur.

References to the 'inboard' and 'outboard' regions of the wing tip device are in relation to the unrolled span of the wing tip device. Similarly references to 'inboard' and 'outboard', in relation to the wing tip device, refer to the inboard and outboard directions along the unrolled span of the wing tip device.

The skilled person will understand the term 'unrolled span' in the context of a non-planar wing tip device. It is confirmed that the unrolled span-wise position is measured as the distance (from the inboard end of the wing tip device) along the leading edge of the wing tip device when projected onto a plane parallel to the Y-Z plane (i.e. a plane parallel to both the Y and Z aircraft axes).

In embodiments of the invention the outboard region is the outboard half of the unrolled wing tip device, i.e. where $0.5 < \eta \leq 1$. In this respect, the outboard region is the region outboard of the unrolled half span position, which is the position located half way along the unrolled span of the wing tip device.

The inboard region is the inboard half of the unrolled wing tip device, i.e. where $0 \leq \eta < 0.5$. In this respect, the inboard region is the region inboard of the unrolled half span position.

In embodiments of the invention the variation of leading edge droop is such that flow separation on the wing tip device first occurs in the unrolled outboard half of the wing tip device.

Optionally the variation of leading edge droop is such that flow separation on the wing tip device first occurs at, or in a region proximal to, the tip of the wing tip device.

The region proximal the tip of the wing tip device may be a region of the wing tip device where $0.7 \leq \eta \leq 1$, preferably where $0.8 \leq \eta \leq 1$, more preferably where $0.9 \leq \eta \leq 1$, even more preferably where $0.95 \leq \eta \leq 1$.

Optionally the variation of leading edge droop is such that flow separation on the wing tip device first occurs at the tip of the wing tip device.

Optionally the maximum leading edge droop of the wing tip device occurs at an unrolled span-wise location such that flow separation first occurs in an outboard region of the wing tip device, preferably at or in a region proximal to the tip of the wing tip device.

Optionally the leading edge droop of the wing tip device is a maximum in an outboard region of the wing tip device.

This is advantageous in that it may encourage flow separation to first occur in the outboard region of the wing tip device. In this respect, it may encourage flow separation to first occur in a region outboard of the location of maximum leading edge droop.

Optionally the maximum leading edge droop is at an unrolled span-wise location where $\eta \geq 0.6$.

In embodiments of the invention the maximum leading edge droop occurs at a location inboard of the tip of the wing tip device. Optionally the maximum leading edge droop is at an unrolled span-wise location where $\eta \leq 0.9$, preferably where $\eta \leq 0.8$. Optionally the maximum leading edge droop is at an unrolled span-wise location where $0.6 \leq \eta \leq 0.9$, preferably where $0.6 \leq \eta \leq 0.8$.

Optionally the leading edge droop decreases outboard from its maximum value, towards the tip of the wing tip device. Optionally the leading edge droop decreases outboard from its maximum value, at the location of maximum leading edge droop, towards the tip of the wing tip device.

This advantageously may encourage flow separation to occur first towards the tip of the wing tip device.

Optionally the leading edge droop decreases from its maximum value, to the tip of the wing tip device.

In embodiments of the invention the leading edge droop at the tip of the wing tip device is less than the maximum value of leading edge droop.

In embodiments of the invention the leading edge droop decreases continuously from its maximum value, to the tip of the wing tip device.

Optionally the leading edge droop at the tip of the wing tip device is the minimum value of leading edge droop of the wing tip device.

Optionally the variation of leading edge droop is such that the flow separation moves inboard as the angle of attack of the wing tip device is increased, preferably such that the flow separation gradually moves inboard as the angle of attack is increased.

Optionally the leading edge droop decreases inboard from its maximum value, towards the inboard end of the wing tip device.

In embodiments of the invention the leading edge droop at the inboard end of the wing tip device is less than the maximum value of leading edge droop.

Optionally the wing tip device comprises a transition region extending from its inboard end where, in the inboard direction, the leading edge droop approaches the leading edge droop at the outboard end of the main wing.

This is advantageous in that it may allow the leading edge droop of the wing tip device to blend smoothly into the leading edge droop at the tip of the main wing, thereby avoiding a discontinuity in leading edge droop (and therefore a discontinuity in aerodynamic properties at that location).

Optionally the leading edge droop at the inboard end of the wing tip device is the same as, or less than, the leading edge droop at the tip of the main wing.

Optionally the leading edge droop at the outboard end of the transition region is less than the maximum leading edge droop.

In embodiments of the invention the outboard end of the transition region is in the inboard region of the wing tip device. Optionally the outboard end of the transition region is at a span-wise location where $0<\eta\leq0.3$, preferably where $0<\eta\leq0.2$.

Optionally the wing tip device has increasing dihedral in the outboard direction.

Optionally the wing tip device curves upwardly towards its tip. Preferably the wing tip device is a curved non-planar wing tip device. The variation of leading edge droop is particularly advantageous when used with a curved non-planar wing tip device.

Optionally the wing tip device is swept back.

Optionally the leading edge sweep angle of the wing tip device increases in the outboard direction such that the leading edge is curved when viewed in plan form.

In embodiments of the invention the region of the wing tip device that extends from the location of maximum leading edge droop to the tip of the wing tip device is a tip region.

In embodiments of the invention the region of the wing tip device that extends from the outboard end of the transition region to the location of maximum leading edge droop is a middle region.

Preferably the middle region is a major region of the wing tip device and the transition region and tip region are minor regions. In this respect, preferably the middle region has a greater unrolled span than each of the transition region and tip region.

Preferably the ratio of the unrolled span of the middle region to the unrolled span of the tip region is greater than or equal to 1.5. Preferably the ratio of the unrolled span of the middle region to the unrolled span of the transition region is greater than or equal to 2.5.

Preferably the leading edge sweep angle of the middle region increases in the outboard direction such that it is curved (when viewed in plan form).

Preferably the dihedral of the middle section increases in the outboard direction such that it curves upwardly.

Preferably the tip region blends into a tip shaping, for example to form a rounded end or Kuchemann tip.

Preferably the wing tip device is a winglet. Preferably the wing tip device is a curved non-planar winglet.

Preferably the wing tip device does not have any movable high lift devices, e.g. slats or flaps.

According to a second aspect of the invention there is provided a wing tip device, wherein the wing tip device has a variation of leading edge droop with respect to unrolled span-wise position such that flow separation on the wing tip device first occurs in an outboard region of the wing tip device.

The wing tip device of the second aspect of the invention may be for use as the wing tip device in the first aspect of the invention. The wing tip device of the second aspect of the invention may have any of the features of the wing tip device in the first aspect of the invention.

According to a third aspect of the invention there is provided an aircraft wing comprising a main wing and a wing tip device at the tip of the main wing, wherein the wing tip device has a variation of leading edge droop with respect to unrolled span-wise position such that the leading edge droop of the wing tip device is a maximum in an outboard region of the wing tip device.

The aircraft wing of the third aspect of the invention may have any of the features of the aircraft wing of the first aspect of the invention. The wing tip device in the third aspect of the invention may have any of the features of the wing tip device in the first aspect of the invention.

According to a fourth aspect of the invention there is provided a wing tip device, wherein the wing tip device has a variation of leading edge droop with respect to unrolled span-wise position such that the leading edge droop of the wing tip device is a maximum in an outboard region of the wing tip device.

The wing tip device of the fourth aspect of the invention may be for use as the wing tip device in the third aspect of the invention. The wing tip device of the fourth aspect of the invention may have any of the features of the wing tip device in the first aspect of the invention.

According to a fifth aspect of the invention there is provided an aircraft comprising an aircraft wing or wing tip device according to any of the preceding aspects of the invention.

In embodiments of the invention the aircraft comprises a pair of the aircraft wings.

Preferably the aircraft is a commercial jet aircraft having a passenger cabin comprising a plurality of rows and columns of seat units for accommodating a multiplicity of passengers, preferably more than 50 passengers. Preferably the aircraft is a powered aircraft and comprises a pair of engines, mounted to the wings, for propelling the aircraft.

According to a sixth aspect of the invention there is provided a method of designing a wing tip device, for use as part of an aircraft wing, wherein the method comprises designing the wing tip device with a variation of leading edge droop with respect to unrolled span-wise position such that flow separation on the wing tip device first occurs in an outboard region of the wing tip device.

Optionally the method comprises the following steps:
(i) Designing a wing tip device with no leading edge droop across its unrolled span, to meet high speed design requirements;
(ii) Applying a variation of leading edge droop with respect to unrolled span-wise position, to the design of the wing tip device, such that flow separation on the wing tip device first occurs in an outboard region of the wing tip device.

According to a seventh aspect of the invention there is provided a method of designing an aircraft wing comprising a main wing and a wing tip device at the tip of the main wing, wherein the method comprises designing the wing tip device according to the sixth aspect of the invention.

According to an eighth aspect of the invention there is provided a method of designing an aircraft comprising designing an aircraft wing according the seventh aspect of the invention.

According to a ninth aspect of the invention there is provided a method of manufacture of a wing tip device comprising designing a wing tip device according to the sixth aspect of the invention and manufacturing a wing tip device according to that design.

According to a tenth aspect of the invention there is provided a method of manufacture of an aircraft wing comprising designing an aircraft wing according to the seventh aspect of the invention and manufacturing an aircraft wing according to that design.

According to an eleventh aspect of the invention there is provided a method of manufacture of an aircraft comprising designing an aircraft according to the eighth aspect of the invention and manufacturing an aircraft according to that design.

Preferably the leading edge droop is defined by the parameter $Droop_{LE}$. In this respect, the references to leading edge droop preferably refer to the parameter $Droop_{LE}$ and the above defined variation in, and relative amounts of, leading edge droop preferably refers to a corresponding variation in, and relative amounts of the parameter $Droop_{LE}$.

The value of $Droop_{LE}$ at each unrolled span-wise location is the distance that the leading edge point is offset towards the lower surface from a reference line, that passes through the trailing edge point and a reference point located mid-way between the upper and lower surfaces of the local aerofoil section at a reference chord-wise position, along a line perpendicular to the reference line, divided by the local chord length.

The reference chord-wise position is selected such that it is in a section of the aerofoil that is far enough back that it is in an 'undrooped' section of the aerofoil.

Preferably the reference point is located rearwardly of the leading edge point by greater than or equal to 0.3 of the local chord length (i.e. where $x/c \geq 0.3$).

Preferably the reference point is located rearwardly of the leading edge point by 0.3 of the local chord length (i.e. where $x/c = 0.3$).

Preferably the wing tip device has a variation of $Droop_{LE}$ with respect to unrolled span-wise position such that flow separation on the wing tip device first occurs in an outboard region of the wing tip device.

Optionally the variation of $Droop_{LE}$ with respect to unrolled span-wise position is such that flow separation on the wing tip device first occurs at, or in a region proximal to, the tip of the wing tip device.

Optionally the variation of $Droop_{LE}$ with respect to unrolled span-wise position is such that flow separation on the wing tip device first occurs at the tip of the wing tip device.

Optionally the maximum $Droop_{LE}$ of the wing tip device occurs at an unrolled span-wise location such that flow separation first occurs in an outboard region of the wing tip device, preferably at or in a region proximal to the tip of the wing tip device.

Optionally the $Droop_{LE}$ of the wing tip device is a maximum in an outboard region of the wing tip device.

Optionally the maximum value of $Droop_{LE}$ occurs at an unrolled span-wise location where $\eta \geq 0.6$.

In embodiments of the invention the maximum value of $Droop_{LE}$ occurs at a location inboard of the tip of the wing tip device. Optionally the maximum value of $Droop_{LE}$ occurs at an unrolled span-wise location where $\eta \leq 0.9$, preferably where $\eta \leq 0.8$. Optionally the maximum value of $Droop_{LE}$ occurs at an unrolled span-wise location where $0.6 \leq \eta \leq 0.9$, preferably where $0.6 \leq \eta \leq 0.8$.

Optionally $Droop_{LE}$ decreases outboard from its maximum value towards the tip of the wing tip device.

Optionally $Droop_{LE}$ decreases from its maximum value to the tip of the wing tip device.

In embodiments of the invention the value of $Droop_{LE}$ at the tip of the wing tip device is less than the maximum value of $Droop_{LE}$.

In embodiments of the invention $Droop_{LE}$ decreases continuously from its maximum value to the tip of the wing tip device.

Optionally the value of $Droop_{LE}$ at the tip of the wing tip device is the minimum value of $Droop_{LE}$ of the wing tip device.

Optionally the variation of $Droop_{LE}$ is such that the flow separation moves inboard as the angle of attack of the wing tip device is increased, preferably such that the flow separation gradually moves inboard as the angle of attack is increased.

Optionally $Droop_{LE}$ decreases inboard from its maximum value towards the inboard end of the wing tip device.

In embodiments of the invention the value of $Droop_{LE}$ at the inboard end of the wing tip device is less than the maximum value of $Droop_{LE}$.

Optionally in the transition region the value of $Droop_{LE}$ approaches the value of $Droop_{LE}$ at the outboard end of the main wing.

Optionally the value of $Droop_{LE}$ at the inboard end of the wing tip device is the same as, or less than, the value of $Droop_{LE}$ at the tip of the main wing.

Optionally the value of $Droop_{LE}$ at the outboard end of the transition region is less than the maximum value of $Droop_{LE}$.

Preferably the ratio of the maximum value of $Droop_{LE}$ to the value of $Droop_{LE}$ at the tip is greater than or equal to 2. Optionally the value of $Droop_{LE}$ at the tip of the wing tip device is less than or equal to 0.02.

Optionally the ratio of the maximum value of $Droop_{LE}$ to the value of $Droop_{LE}$ at the inboard end of the wing tip device is greater than or equal to 1.5.

In embodiments of the invention the region of the wing tip device that extends from the location of the maximum value of $Droop_{LE}$ to the tip of the wing tip device is the tip region. In embodiments of the invention the region of the wing tip device that extends from the outboard end of the transition region to the location of the maximum value of $Droop_{LE}$ is the middle region.

Preferably the method of the sixth aspect of the invention comprises designing the wing tip device with a variation of $Droop_{LE}$ with respect to unrolled span-wise position such that flow separation on the wing tip device first occurs in an outboard region of the wing tip device.

Optionally the method comprises the following steps:
(i) Designing a wing tip device where $Droop_{LE}$ is zero across its unrolled span, to meet high speed design requirements;
(ii) Applying a variation in $Droop_{LE}$ with respect to unrolled span-wise position, to the design of the wing tip device, such that flow separation on the wing tip device first occurs in an outboard region of the wing tip device.

Alternatively, or additionally, the leading edge droop may be defined by the parameter $Y5_{Upper}$. In this respect, the references to leading edge droop preferably refer to the parameter $Y5_{Upper}$ and the above defined variation in, and amounts of, leading edge droop preferably refers to a corresponding variation in, and amounts of the parameter $Y5_{Upper}$.

The value of $Y5_{Upper}$ at each unrolled span-wise location on the wing tip device is the distance of the upper surface of the local aerofoil section from the local chord line along a line that is normal to the chord line and intersects the chord line at a position located rearwardly of the leading edge point by 0.05 of the local chord length (i.e. where x/c=0.05), divided by the local chord length.

Preferably the wing tip device has a variation of $Y5_{Upper}$ with respect to unrolled span-wise position such that flow separation on the wing tip device first occurs in an outboard region of the wing tip device.

Optionally the variation of $Y5_{Upper}$ is such that flow separation on the wing tip device first occurs at, or in a region proximal to, the tip of the wing tip device.

Optionally the variation of $Y5_{Upper}$ with respect to unrolled span-wise position is such that flow separation on the wing tip device first occurs at the tip of the wing tip device.

Optionally the maximum $Y5_{Upper}$ of the wing tip device occurs at an unrolled span-wise location such that flow separation first occurs in an outboard region of the wing tip device, preferably at or in a region proximal to the tip of the wing tip device.

Optionally the $Y5_{Upper}$ of the wing tip device is a maximum in an outboard region of the wing tip device.

Optionally the maximum value of $Y5_{Upper}$ occurs at an unrolled span-wise location where $\eta \geq 0.6$.

In embodiments of the invention the maximum value of $Y5_{Upper}$ occurs at a location inboard of the tip of the wing tip device. Optionally the maximum value of $Y5_{Upper}$ is at an unrolled span-wise location where $\eta \leq 0.9$, preferably where $\eta \leq 0.8$. Optionally the maximum value of $Y5_{Upper}$ is at an unrolled span-wise location where $0.6 \leq \eta \leq 0.9$, preferably where $0.6 \leq \eta \leq 0.8$.

Optionally $Y5_{Upper}$ decreases outboard from its maximum value towards the tip of the wing tip device.

Optionally $Y5_{Upper}$ decreases outboard from its maximum value to the tip of the wing tip device.

In embodiments of the invention the value of $Y5_{Upper}$ at the tip of the wing tip device is less than the maximum value of $Y5_{Upper}$.

In embodiments of the invention $Y5_{Upper}$ decreases continuously from its maximum value to the tip of the wing tip device.

Optionally the value of $Y5_{Upper}$ at the tip of the wing tip device is the minimum value of $Y5_{Upper}$ of the wing tip device.

Optionally the variation of $Y5_{Upper}$ is such that the flow separation moves inboard as the angle of attack of the wing tip device is increased, preferably such that the flow separation gradually moves inboard as the angle of attack is increased.

Optionally $Y5_{Upper}$ decreases inboard from its maximum value towards the inboard end of the wing tip device.

In embodiments of the invention the value of $Y5_{Upper}$ at the inboard end of the wing tip device is less than the maximum value of $Y5_{Upper}$.

Optionally in the transition region the value of $Y5_{Upper}$ approaches the value of $Y5_{Upper}$ at the outboard end of the main wing.

Optionally the value of $Y5_{Upper}$ at the inboard end of the wing tip device is the same as, or less than, the value of $Y5_{Upper}$ at the tip of the main wing.

Optionally the value of $Y5_{Upper}$ at the outboard end of the transition region is less than the maximum value of $Y5_{Upper}$.

Preferably the ratio of the maximum value of $Y5_{Upper}$ to the value of $Y5_{Upper}$ at the tip is greater than or equal to 1.3.

Optionally the ratio of the maximum value of $Y5_{Upper}$ to the value of $Y5_{Upper}$ at inboard end of the wing tip device is greater than or equal to 1.3.

Optionally the value of $Y5_{Upper}$ at the tip of the wing tip device is less than or equal to 0.04.

Optionally the ratio of the maximum value of $Y5_{Upper}$ to the value of $Y5_{Upper}$ at the outboard end of the transition region is greater than or equal to 1.1.

In embodiments of the invention the region of the wing tip device that extends from the location of the maximum value of $Y5_{Upper}$ to the tip of the wing tip device is the tip region.

In embodiments of the invention the region of the wing tip device that extends from the outboard end of the transition region to the location of the maximum value of $Y5_{Upper}$ is the middle region.

Preferably the method of the sixth aspect of the invention comprises designing the wing tip device with a variation of $Y5_{Upper}$ with respect to unrolled span-wise position such that flow separation on the wing tip device first occurs in an outboard region of the wing tip device.

Optionally the method comprises the following steps:
(i) Designing a wing tip device where the values of $Y5_{Upper}$ are such that the wing tip device has no leading edge droop across its unrolled span, to meet high speed design requirements;
(ii) Applying a variation in leading edge droop, by applying a variation in $Y5_{Upper}$, with respect to unrolled span-wise position to the design of the wing tip device, such that flow separation on the wing tip device first occurs in an outboard region of the wing tip device.

Preferably the leading edge droop is defined by the combination of the parameters $Droop_{LE}$ and $Y5_{Upper}$. In this respect, the references to leading edge droop preferably refers to both parameters $Droop_{LE}$ and $Y5_{Upper}$ and the above defined variation in, and relative amounts of, leading edge droop preferably refers to a corresponding variation in, and relative amounts of both parameters $Droop_{LE}$ and $Y5_{Upper}$.

Preferably the wing tip device has a variation of $Droop_{LE}$ and $Y5_{Upper}$ with respect to unrolled span-wise position such that flow separation on the wing tip device first occurs in an outboard region of the wing tip device.

Optionally the variation of $Droop_{LE}$ and $Y5_{Upper}$ with respect to unrolled span-wise position is such that flow separation on the wing tip device first occurs at, or in a region proximal to, the tip of the wing tip device.

Optionally the variation of $Droop_{LE}$ and $Y5_{Upper}$ with respect to unrolled span-wise position is such that flow separation on the wing tip device first occurs at the tip of the wing tip device.

Optionally the maximum $Droop_{LE}$ and $Y5_{Upper}$ of the wing tip device occurs at an unrolled span-wise location such that flow separation first occurs in an outboard region of the wing tip device, preferably at or in a region proximal to the tip of the wing tip device.

Optionally the $Droop_{LE}$ and $Y5_{Upper}$ of the wing tip device are a maximum in an outboard region of the wing tip device.

Preferably the method of the sixth aspect of the invention comprises designing the wing tip device with a variation of $Droop_{LE}$ and $Y5_{Upper}$ with respect to unrolled span-wise position such that flow separation on the wing tip device first occurs in an outboard region of the wing tip device.

Optionally the method comprises the following steps:
(i) Designing a wing tip device where $Droop_{LE}$ is zero across its unrolled span and where the values of $Y5_{Upper}$ are such that the wing tip device has no leading edge droop across its unrolled span, to meet high speed design requirements;
(ii) Applying a variation in $Droop_{LE}$ and $Y5_{Upper}$ with respect to unrolled span-wise position, to the design of the wing tip device, such that flow separation on the wing tip device first occurs in an outboard region of the wing tip device.

Any of the above aspects of the invention may incorporate any of the features of the other aspects of the invention. For example, the method of any of the above aspects may include features of the aircraft wing or wing tip device of any of the other aspects of the invention, and vice-versa.

Other preferred and advantageous features of the invention will be apparent from the following description.

DESCRIPTION OF THE DRAWINGS

Embodiments of the present invention will now be described by way of example only with reference to the accompanying drawings of which.

DETAILED DESCRIPTION

Figure 1:
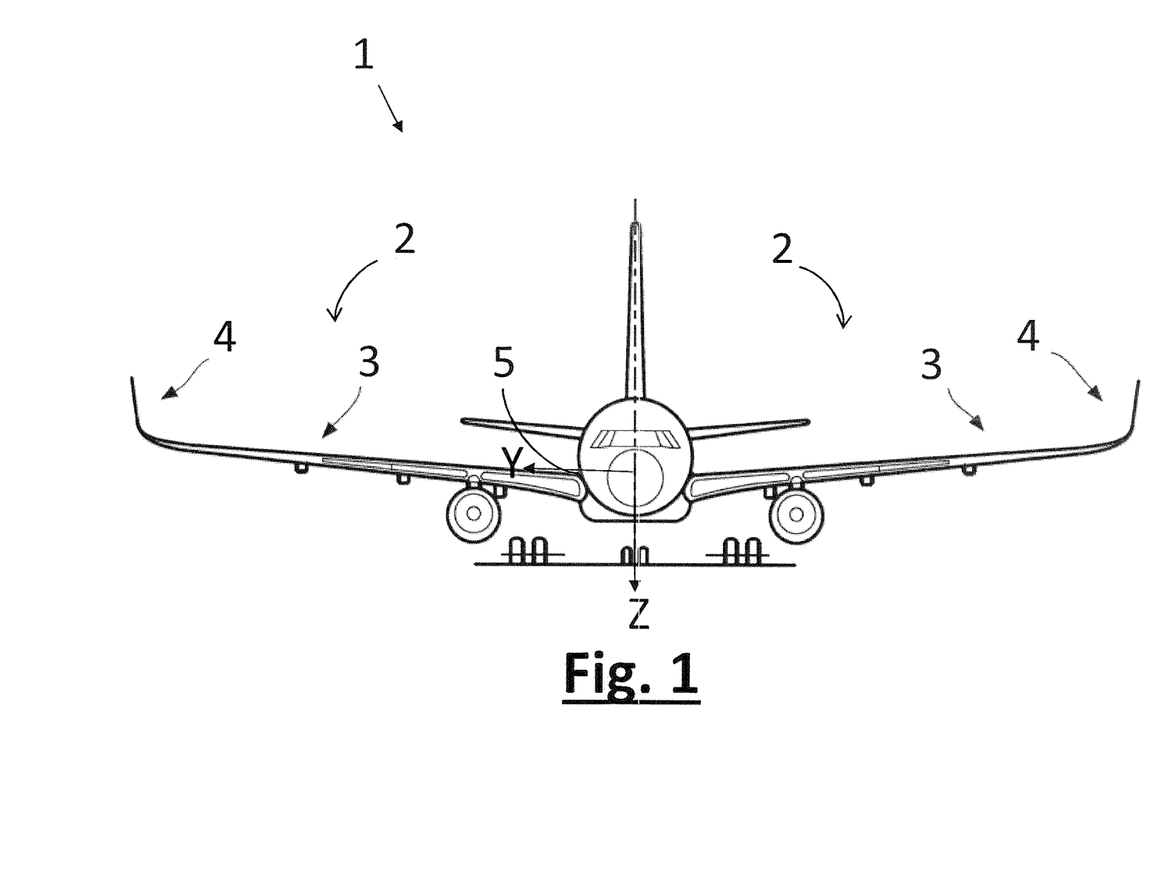
FIG. 1 is a front view of an aircraft according to an embodiment of the invention.

FIG. 1 illustrates an aircraft 1 according to an embodiment of the invention. The aircraft 1 is a commercial jet aircraft that comprises a pair of wings 2. The aircraft 1 is a passenger aircraft comprising a passenger cabin comprising a plurality of rows and columns of seat units for accommodating a multiplicity of passengers, in this case more than 50 passengers. The aircraft 1 is a powered aircraft and comprises a pair of engines, mounted under the wings 2, for propelling the aircraft 1.

Figure 2:
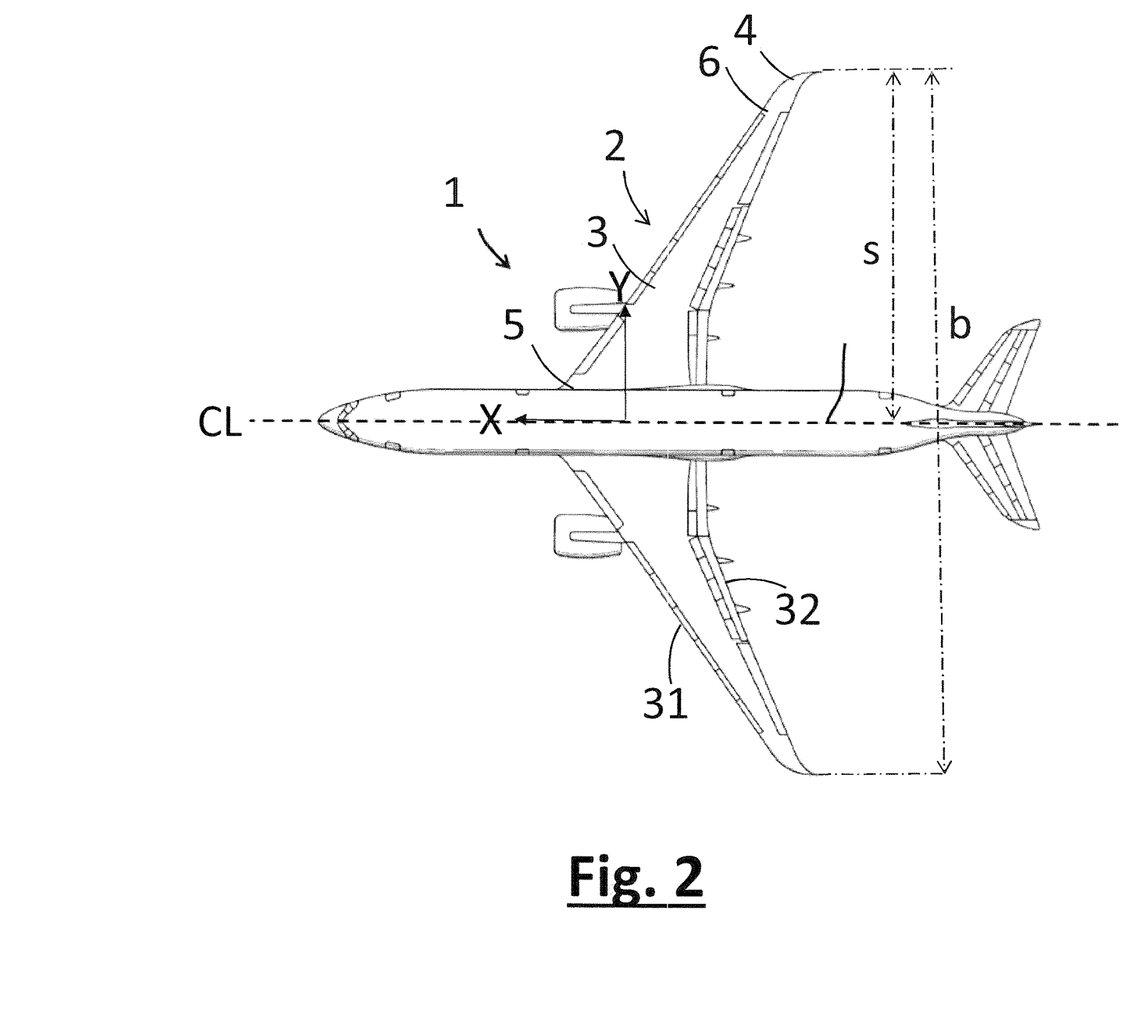
FIG. 2 is a plan view, from above, of the aircraft shown in FIG. 1.

Referring to FIGS. 1 and 2, the aircraft 1 has a longitudinal (roll) axis (X) that has its origin at the centre of gravity of the aircraft and is directed forward, parallel to the centreline (CL) of the fuselage of the aircraft 1, a lateral (pitch) axis (Y) that also has its origin at the centre of gravity and is directed to the right of the aircraft 1 (to starboard), parallel to a line drawn from wingtip to wingtip of the aircraft 1 (i.e. parallel to the span-wise direction) and a normal (yaw) axis (Z) that also has its origin at the centre of gravity and is directed towards the bottom of the aircraft 1, perpendicular to both the longitudinal axis (X) and the lateral axis (Y).

Each wing 2 comprises a main wing 3 and a wing tip device in the form of a winglet 4 attached to the outboard tip 6 of the main wing 3. Each wing 2 is identical and so only one of the wings 2 (the starboard wing) will be described below. It will be appreciated that the description of this wing 2 also applies to the other wing 2 (the port wing).

The aircraft 1 has a total wingspan (b) and each wing 2 has a semi-span (s).

For each wing 2, the main wing 3 extends outboard in the span-wise direction from a root 5, located at the intersection with the aircraft fuselage, to a tip 6 (see FIG. 2). The main wing 3 is tapered and is swept back. In this respect, the main wing 3 has leading and trailing edges 31, 32 that are each swept back, with the trailing edge 32 being swept back slightly less than the leading edge 31.

Figure 3:
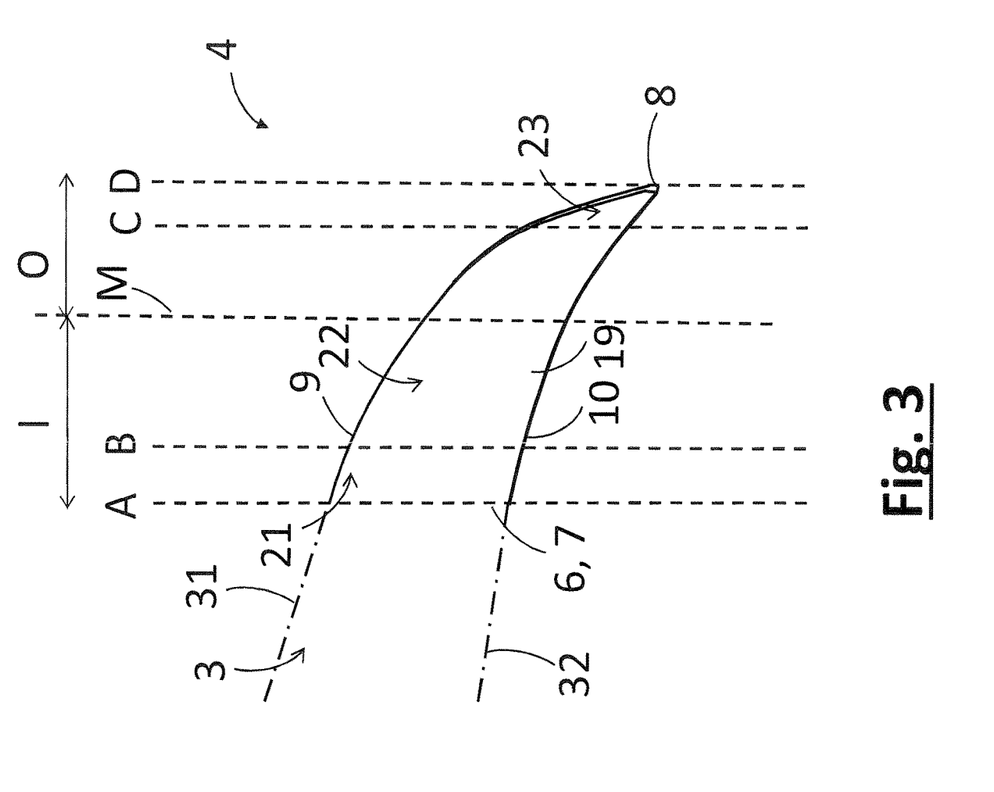
FIG. 3 is plan view, from above, of the starboard winglet of the aircraft shown in FIGS. 1 and 2.
Figure 4:
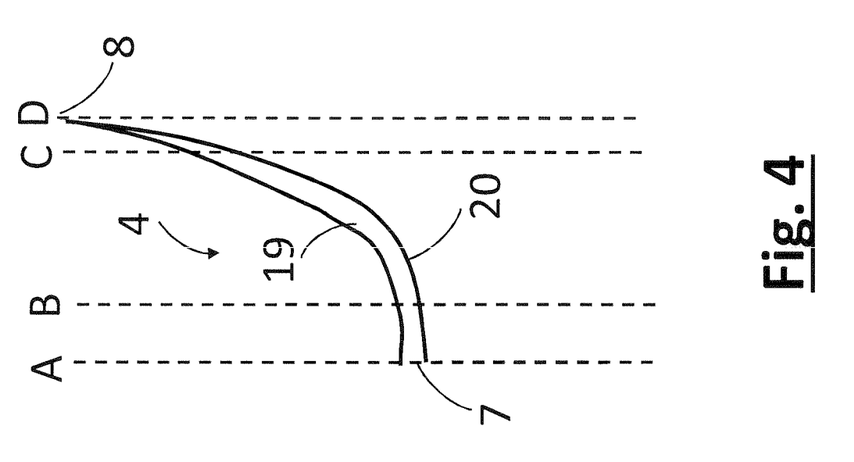
FIG. 4 is a rear view of the winglet shown in FIG. 3.
Figure 5:
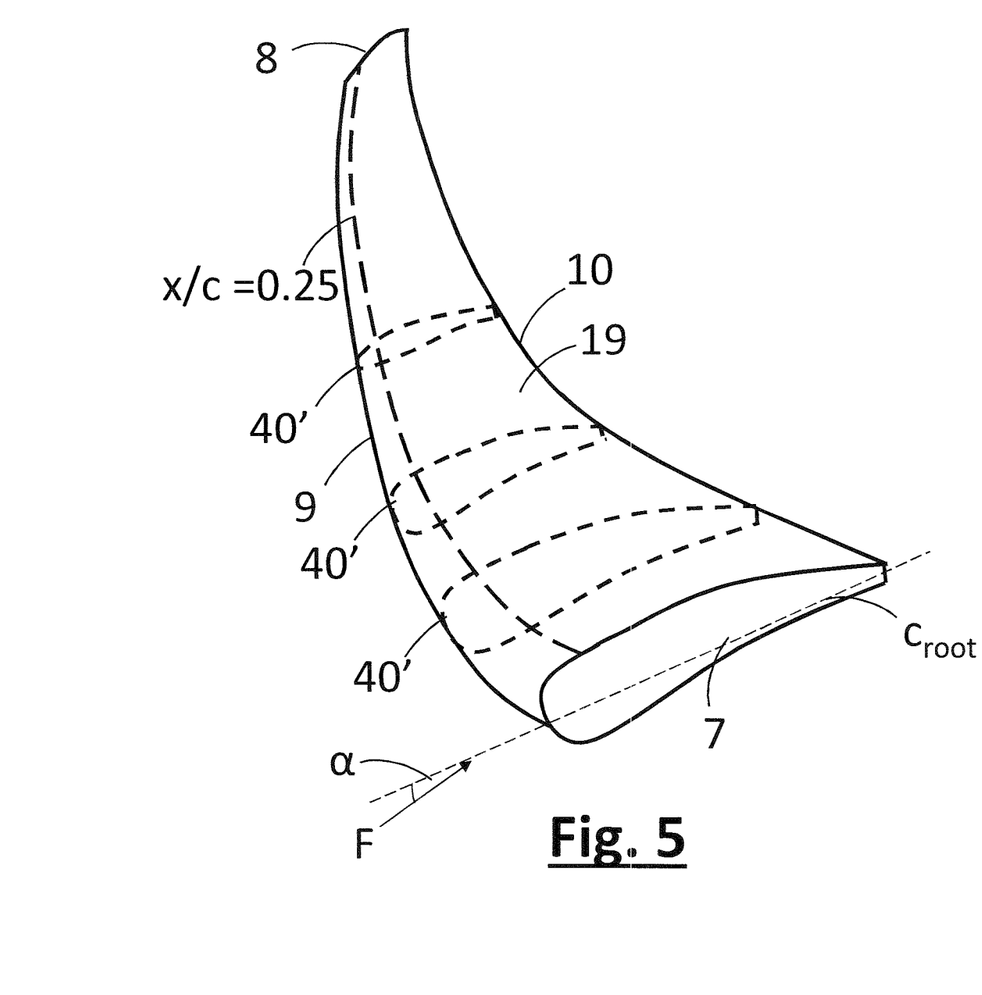
FIG. 5 is a perspective view of the winglet shown in FIGS. 3 and 4 (with example local aerofoils shown in dotted lines)

Referring to FIGS. 3 to 5, each winglet 4 extends outboard from an inboard end 7, attached to the outboard tip 6 of the main wing 3, to a tip 8. The winglet 4 also extends in a chord-wise direction from a leading edge 9 to a trailing edge 10.

The winglet 4 is non-planar and curves upwardly as it extends outboard towards the tip 8. The curvature of local dihedral increases from a low angle, or an angle of approximately zero, at or near the outboard end of the main wing 3 and increases in the outboard direction. The tip 8 of the winglet 4 is almost vertical but is inclined at a small angle with respect to the vertical plane.

The winglet 4 is swept back. In this respect, the leading edge 9 of the winglet 4 is curved and, as the winglet 4 extends outboard in the span-wise direction, the sweep angle of the leading edge of the winglet 4 increases. The trailing edge 10 of the winglet 4 is also slightly curved and, as the winglet 4 extends outboard in span-wise direction, the sweep angle of the trailing edge 10 of the winglet 4 increases slightly.

The leading and trailing edges 9, 10 of the winglet 4 are continuations of the leading and trailing edges 31, 32 of main wing 3. Furthermore, the upper and lower surfaces 19, 20 of the winglet 4 (see below) are continuations of the upper and lower surfaces of the main wing 3. Thus there is a smooth transition, from the main wing 3 to the winglet 4.

It will be appreciated that there may be a smooth transition, even where there are changes in sweep or twist at the junction between the main wing 3 and winglet 4. However, there are preferably no discontinuities at the junction between the main wing 3 and winglet 4.

The winglet 4 is used to reduce the lift induced drag on the wing 2, leading to improved fuel efficiency and reduced carbon emissions. In the currently described embodiment the winglet 4 is fixed with respect to the main wing 3.

The winglet 4 comprises upper and lower skins that form upper and lower surfaces 19, 20 (see FIG. 4) of the winglet 4. The upper and lower surfaces 19, 20 are the upper and lower aerodynamic surfaces that are exposed to the air flow during flight.

The non-dimensional parameter 'η' if will be used to define the unrolled span-wise position along the winglet 4. In this respect, $$\eta = y_w/s_w,$$

where:
- $y_w$=the distance (from the inboard end of the winglet) along the leading edge of the winglet when projected onto a plane parallel to the Y-Z plane (i.e. a plane parallel to both the Y and Z aircraft axes); and
- $s_w$=the total end to end length of a projection of the leading edge of the winglet onto a plane parallel to the Y-Z plane.

In this respect, '$s_w$' is the 'unrolled span' of the winglet, which is the span of the winglet if it was unrolled to be flat and '$y_w$' is the distance along the unrolled span of the winglet. Furthermore, 'η' is the proportion (of the unrolled span) along the unrolled span in the outboard direction (η=0 corresponding to the inboard end 7 of the winglet 4 and η=1 corresponding to the tip 8 of the winglet 4).

In this respect η corresponds to the unrolled span-wise position along the winglet 4.

It will be appreciated that $y_w$ and $s_w$ have the same units of distance (and may have any units of distance, as long as they are the same), such that η is a non-dimensional parameter.

It will also be appreciated that if a winglet is flat (in reality), then its 'unrolled' span is the actual span of the winglet.

The winglet 4 comprises an inboard region (labelled 'I' in FIG. 3) and an outboard region (labelled 'O' in FIG. 3). References to the 'inboard' and 'outboard' regions are in relation to the unrolled span of the winglet 5. Similarly references to 'inboard' and 'outboard', in relation to the winglet 4, refer to the inboard and outboard directions along the unrolled span of the winglet 4.

The inboard region (I) is the region inboard of the unrolled half span position (M) of the winglet 4, which is the position (M) located half way along the unrolled span of the winglet 4. In this respect, the inboard region (I) is the inboard half of the unrolled winglet 4, i.e. where 0≤η<0.5. The outboard region (O) is the region outboard of the unrolled half span position (M). In this respect, the outboard region (O) is the outboard half of the unrolled winglet 4, i.e. where 0.5<η≤1.

Referring to FIG. 3, the winglet 4 comprises a transition region 21, a middle region 22 and a tip region 23. The transition region 21 extends outboard from the inboard end 7 of the winglet 4 (located at unrolled span-wise position A along the winglet 4) to an outboard end, located at unrolled span-wise position B along the winglet 4. In the transition region the winglet 4 blends into the tip 6 of the main wing 3.

The middle region 22 extends outboard from the outboard end of the transition region 21 to an outboard end, located at unrolled span-wise position C of the winglet 4.

The tip region 23 extends outboard from the outboard end of the middle region 22 to an outboard end, at the tip 8 of the winglet 4 (located at unrolled span-wise position D of the winglet 4).

In the currently described embodiment the outboard end of the transition region 21 (unrolled span-wise position B) is located at η=0.2 and the outboard end of the middle region 22 (unrolled span-wise position C) is located at η=0.7.

Various parameters will now be described to define the shape of the winglet 4, in particular the variation in leading edge droop of the winglet 4 with unrolled span-wise position.

Referring to FIG. 5, the local aerofoil 40' at each span-wise location is defined as the cross-sectional shape created by the intersection of the winglet 4 with a plane that is perpendicular to the local direction of the projection of the quarter chord line (i.e. where x/c=0.25; see the dashed line in FIG. 5 labelled with x/c=0.25) on a plane that is parallel to the Y-Z plane (i.e. a plane parallel to both the Y and Z aircraft axes).

The total combination of local aerofoils 40' defines the exterior shape of the winglet 4.

Figure 6:
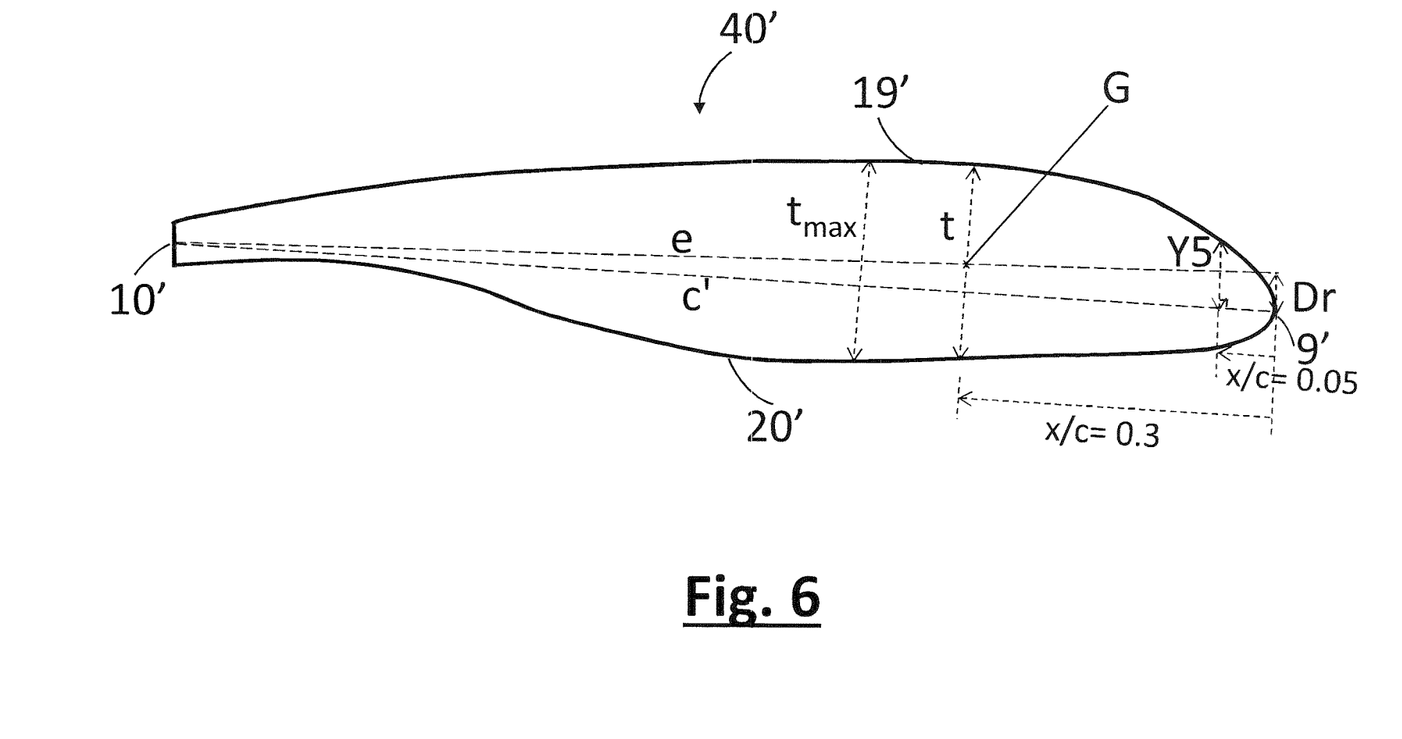
FIG. 6 shows a schematic view of a local aerofoil of the winglet shown in FIGS. 3 to 5, to illustrate parameters used to define the leading edge droop of the winglet.

FIG. 6 shows a schematic view of a local aerofoil 40' of the winglet 4 (at a notional unrolled span-wise position). It will be appreciated that FIG. 6 is a schematic view and is not to scale.

Each local aerofoil 40' has a leading edge point 9', a trailing edge point 10' and a local chord line (c). The trailing edge point 10' is defined as the aft-most point of the local aerofoil 40' if such a unique point exists, or as the centroid of all aft-most points if otherwise. The leading edge point 9' is defined as the point on the local aerofoil 40' furthest from the trailing edge point 10'. The local chord line (c') is a straight line joining the leading edge point 9' and the trailing edge point 10'. The local chord (c) is the length of the local chord line (c') (i.e. between the leading edge point 9' and the trailing edge point 10').

Also shown in FIG. 6, the maximum local aerofoil thickness $t_{max}$ is defined as the maximum distance normal to the chord line (c') between the upper surface 19' and the lower surface 20' of the local aerofoil 40'.

In the currently described embodiment, the angle of attack of the winglet 4 is the angle (α) (see FIG. 5) between the flight direction (F) and the root chord ($c_{root}$) of the winglet 4. However, it will be appreciated that any suitable reference line on the winglet 4 may be used.

The winglet 4 has a variation of leading edge droop with respect to unrolled span-wise position along the winglet 4 such that flow separation on the winglet 4 first occurs in the region of the tip 8 of the winglet 4.

The winglet 4 does not have any movable high lift devices, e.g. slats or flaps.

FIG. 6 also illustrates various parameters that are used to define and quantify the leading edge droop. In the currently described embodiments, leading edge droop is defined and quantified by the parameters $Droop_{LE}$ and $Y5_{Upper}$.

The parameter $Droop_{LE}$ at each span-wise location along the winglet 4 refers to the distance (Dr) that the leading edge point 9' is offset towards the lower surface 20' from a reference line (e), that passes through the trailing edge point 10' and a reference point G located mid-way between the upper and lower surfaces 19', 20' of the local aerofoil section at a reference chord-wise position, along a line perpendicular to the reference line (e), divided by the local chord length (c).

The reference chord-wise position is selected such that it is in a section of the aerofoil that is far enough back that it is in an 'undrooped' section of the aerofoil. In the currently described embodiment the reference point G is located rearwardly of the leading edge point 9' by 0.3c (i.e. 0.3 of the local chord length (c). This position is defined as x/c=0.3, where x is the distance along the chord line (c') from the leading edge point 9' (towards the trailing edge point 10') and c is the local chord length).

The reference chord-wise position may be located at any chord-wise location that is rearwardly enough from the leading edge point 9' such that it is in an 'undrooped' section of the aerofoil. Preferably the reference point G is located rearwardly of the leading edge point 9' by greater than or equal to 0.3 of the local chord length (i.e. where x/c≥0.3). More preferably the reference point G is located rearwardly of the leading edge point 9 by 0.3 of the local chord length (c) (i.e. where x/c=0.3).

Referring again to FIG. 6, the parameter $Y5_{Upper}$ is the distance (Y5) of the upper surface 19' of the local aerofoil section 40' from the chord line (c') along a line that is normal to the chord line (c') and intersects the chord line (c') at a position located rearwardly of the leading edge point 9' by 0.05c (i.e. where x/c=0.05), divided by the local chord length (c).

Figure 7:
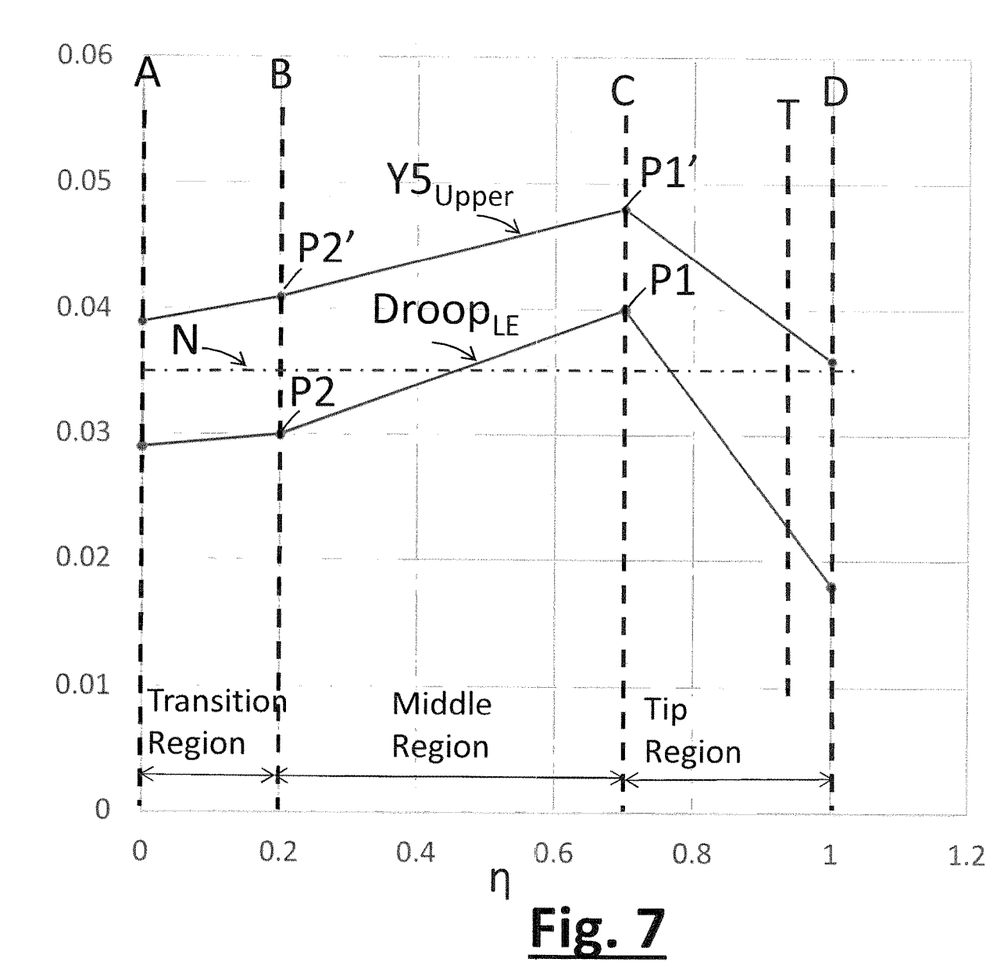
FIG. 7 shows the variation in the leading edge droop parameters $Droop_{LE}$ and $Y5_{Upper}$ with respect to the unrolled span-wise position ($\eta$) along the winglet.

In FIG. 7 the lower line (labelled '$Droop_{LE}$') shows the variation in $Droop_{LE}$ with respect to the unrolled span-wise position (η) along the winglet 4. The x-axis (i.e. where $Droop_{LE}$=0) represents the value of $Droop_{LE}$ at zero leading edge droop.

The upper line (labelled '$Y5_{Upper}$') shows the variation in $Y5_{Upper}$ with respect to the unrolled span-wise position (η) along the winglet 4. The horizontal dashed line N represents the value of $Y5_{Upper}$ at zero leading edge droop.

The values of $Droop_{LE}$ and $Y5_{Upper}$ are shown at the unrolled span-wise positions where η=0, 0.2, 0.7 and 1. Straight lines joining these points are also shown, to show the general change between these values. However, it will be appreciated that the values between these points may not lie on these straight lines.

As leading edge droop increases, the nose radius of the aerofoil is increased, to accommodate the droop.

The winglet 4 has a variation of leading edge droop with respect to unrolled span-wise position (η) such that flow separation on the winglet 4 first occurs in the outboard region (O) of the winglet 4. In this respect, the winglet 4 has a variation of $Droop_{LE}$ and $Y5_{Upper}$ with respect to unrolled span-wise position (η) such that flow separation on the winglet 4 first occurs in the outboard region (O) of the winglet 4.

In the currently described embodiment, the variation of leading edge droop with respect to unrolled span-wise position (η) is such that flow separation on the winglet 4 first occurs in a region proximal to the tip 8 of the winglet. In this respect, in the currently described embodiment the flow separation first occurs at the span-wise location (T) where η=0.95.

The variation in leading edge droop with respect to unrolled span-wise position is such that the leading edge droop is a maximum in the outboard region (O) of the winglet 4, at a location proximal the tip 8 of the winglet 4. In this respect, the values of $Droop_{LE}$ and $Y5_{Upper}$ are a maximum in the outboard region (O) of the winglet 4

More specifically, in the current embodiment, the leading edge droop is a maximum at unrolled span-wise location (C) where η=0.7. In this respect, as shown in FIG. 7, the maximum value (P1) of $Droop_{LE}$ occurs at η=0.7. The maximum value (P1') of $Y5_{Upper}$ also occurs at η=0.7. In the currently described embodiment the maximum value (P1) of $Droop_{LE}$ is 0.041 and the maximum value (P1') of $Y5_{Upper}$ is 0.048.

The feature that the leading edge droop is a maximum in the outboard region (O) of the winglet 4 is advantageous in that it may encourage flow separation to first occur in the outboard region (O) of the winglet 4. In this respect, it may encourage flow separation to first occur in a region outboard of the location of maximum leading edge droop.

The leading edge droop decreases outboard from its maximum value, at the location of maximum leading edge droop, towards the tip 8 of the winglet 4. This advantageously may encourage flow separation to occur first towards the tip 8 of the winglet 4.

In this respect, the leading edge droop at the tip 8 of the winglet 4 is less than the maximum value of leading edge droop and the leading edge droop decreases continuously from its maximum value, at the location of maximum leading edge droop, to the tip 8 of the winglet 4.

As shown in FIG. 7, the value of $Droop_{LE}$ decreases continuously from its maximum value (P1), at the location of maximum leading edge droop, to the tip 8 of the winglet 4. Similarly, the value of $Y5_{Upper}$ decreases continuously from its maximum value (P1'), at the location of maximum leading edge droop, to the tip 8 of the winglet 4.

The leading edge droop at the tip 8 of the winglet 4 is the minimum value of leading edge droop of the winglet 4. In this respect, as shown in FIG. 7, the values of $Droop_{LE}$ and $Y5_{Upper}$ are each a minimum at the tip 8 of the winglet 4. The value of $Droop_{LE}$ at the tip 8 is 0.017 and the value of $Y5_{Upper}$ is 0.036.

Preferably the ratio of the maximum value of $Droop_{LE}$ to the value of $Droop_{LE}$ at the tip 8 is greater than or equal to 2. Preferably the ratio of the maximum value of $Y5_{Upper}$ to the value of $Y5_{Upper}$ at the tip 8 is greater than or equal to 1.3.

The variation of leading edge droop with respect to unrolled span-wise position is such that the flow separation gradually moves inboard, from the location (T) at which flow separation first occurs, as the angle of attack (a) of the winglet 4 is increased.

It will be appreciated that 'gradually moves inboard' means that the flow separation propagates from the location (T) at which it first occurs, as opposed to instantaneously occurring at remote locations from that propagating flow separation (e.g. as opposed to instantaneously occurring across the entire span of the wing tip device).

In this respect, the leading edge droop decreases inboard from its maximum value, at unrolled span-wise position (C), towards the inboard end 7 (at unrolled span-wise position (A)) of the winglet 4.

In this respect, the leading edge droop at the inboard end 7 of the winglet 4 is less than the maximum value of leading edge droop. In this respect, the values of $Droop_{LE}$ and $Y5_{Upper}$ at the inboard end 7 are less than their maximum values.

In the current embodiment, the value of $Droop_{LE}$ is 0.028 at the inboard end 7 of the winglet 4.

In the current embodiment, the value of $Y5_{Upper}$ at the inboard end 7 of the winglet 4 is 0.038.

The outboard end (B) of the transition region 21 is at a span-wise location where η=0.2. In the transition region 21, in the inboard direction the leading edge droop approaches the leading edge droop at the tip 6 of the main wing 3. In this respect, the values of $Droop_{LE}$ and $Y5_{Upper}$ approach the values of $Droop_{LE}$ and $Y5_{Upper}$ at the tip 6 of the main wing 3. This is advantageous in that it may allow the leading edge droop of the winglet 4 to blend smoothly into the leading edge droop at the tip 6 of the main wing 3, thereby avoiding a discontinuity in leading edge droop (and therefore a discontinuity in aerodynamic properties at that location).

In the currently described embodiment the leading edge droop at the inboard end 7 of the winglet 4 is the same as the leading edge droop at the tip 6 of the main wing 3. Alternatively the leading edge droop at the inboard end 7 of the winglet 4 may be less than the leading edge droop at the tip 6 of the main wing 3.

The leading edge droop at the outboard end of the transition region is less than the maximum leading edge droop. In this respect, the value of $Droop_{LE}$ at the outboard end of the transition region is less than the value of maximum $Droop_{LE}$. Also, the value of $Y5_{Upper}$ at the outboard end of the transition region is less than the value of maximum $Y5_{Upper}$. In the current embodiment, the value of $Droop_{LE}$ at the outboard end (B) of the transition region 21 (P2) is 0.03. The ratio of the maximum value of $Droop_{LE}$ to the value of $Droop_{LE}$ at the outboard end (B) of the transition region 21 is 1.37. Preferably the ratio of the maximum value of $Droop_{LE}$ to the value of $Droop_{LE}$ at the outboard end (B) of the transition region 21 is greater than or equal to 1.3. In the current embodiment, the value of $Y5_{Upper}$ at the outboard end (B) of the transition region 21 (P2') is 0.041. The ratio of the maximum value of $Y5_{Upper}$ to the value of $Y5_{Upper}$ at the outboard end (B) of the transition region 21 is 1.17. Preferably the ratio of the maximum value of $Y5_{Upper}$ to the value of $Y5_{Upper}$ at the outboard end (B) of the transition region 21 is greater than or equal to 1.1.

According to a further embodiment of the invention there is provided a method 105 of designing the aircraft wing 2 (i.e. the aircraft wing 2 of the above described embodiment of the invention). The method comprises designing the winglet 4, according to a further embodiment of the invention. The method comprises designing the winglet 4 with a variation of leading edge droop with respect to unrolled span-wise position such that flow separation on the winglet 4 first occurs in the outboard region (O) of the winglet 4.

Figure 8:
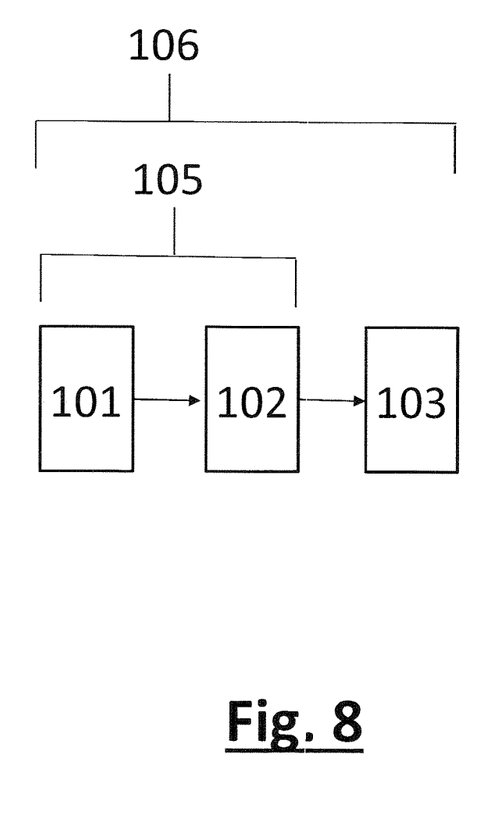
FIG. 8 is a flow-chart showing the steps of a method of design and method of manufacture of an aircraft wing according to a further embodiment of the invention.

In this respect, with reference to FIG. 8, the method comprises the following steps:
(i) Designing a wing tip device with no leading edge droop across its unrolled span, to meet high speed design requirements (step 101);
(ii) Applying a variation in leading edge droop with respect to unrolled span-wise position, to the design of the wing tip device, such that flow separation on the wing tip device first occurs in an outboard region of the wing tip device (step 102).

The high speed requirements may, for example, be to provide a certain reduction in lift induced drag at the operating cruise speed of the aircraft 1.

A method of manufacture (106) of the aircraft wing 2 comprising designing the aircraft wing according to the above method (105) and manufacturing an aircraft wing according to that design (step 103). It will be appreciated that a method of manufacture of the winglet 4 comprises designing the winglet according to the above method and manufacturing a winglet to that design.

A method of design of the aircraft 1, according to a further embodiment of the invention, comprises designing an aircraft wing according to the above method (105), where the aircraft wing is part of a design of an aircraft.

A method of manufacture of the aircraft 1, according to a further embodiment of the invention, comprises designing an aircraft according to the above method and manufacturing an aircraft according to that design.

In summary, in the embodiments of the invention the variation in leading edge droop of the winglet 4, with respect to unrolled span-wise position, is such that flow separation on the winglet 4 first occurs at a location in an outboard region of the winglet, in particular towards the tip of the winglet 4.

The progression and growth of the stall inboard is delayed. This improves the winglet low speed characteristics. In this respect, it both increases the aircraft incidence at which the winglet flow begins to separate and extends the period between the onset of flow separation on the winglet and the point at which the winglet becomes fully separated. This results in a low speed drag improvement extending over a larger part of the aircraft operating flight envelope together with more benign and symmetrical handling qualities.

Accordingly it provides improved low speed handling characteristics, without significantly affecting the performance of the winglet 4 at high speed (e.g. at operating cruise speed).

Whilst the present invention has been described and illustrated with reference to particular embodiments, it will be appreciated by those of ordinary skill in the art that the invention lends itself to many different variations not specifically illustrated herein.

In the currently described embodiments, leading edge droop is defined by the combination of the parameters $Droop_{LE}$ and $Y5_{Upper}$. It may be that leading edge droop is defined by only one of these parameters, for example it may be that leading edge droop is only defined by $Droop_{LE}$ or $Y5_{Upper}$. However, preferably the leading edge droop is defined by the combination of parameters $Droop_{LE}$ and $Y5_{Upper}$.

In the currently described embodiment, the variation of leading edge droop with respect to unrolled span-wise position along the winglet 4 is such that flow separation on the winglet 4 first occurs in the region of the tip 8 of the winglet 4. Alternatively, or additionally, the variation of leading edge droop may such that flow separation on the winglet 4 first occurs anywhere in the outboard region (O) of the winglet 4. However, it is preferred that the flow separation first occurs in the region of the tip 8 of the winglet 4.

In the currently described embodiment the wing tip device is a curved non-planar winglet. However, the wing tip device may be another type of winglet or wing tip device, for example a raked wing tip.

In the currently described embodiment the winglet 4 is fixed with respect to the main wing 3. Alternatively, the winglet 4 may be movable relative to the main wing 3. In this respect, the winglet 4 may be rotatable, relative to the main wing 3, between a flight configuration for use during flight and a ground configuration for use during ground-based operations, in which the span of the wing 2 is reduced.

The aircraft may be any type of aircraft, including any air vehicle, such as a manned aircraft or a UAV. However, the aircraft is preferably a passenger aircraft.

Where 'or' is used in the foregoing description, this it to be taken to mean 'and/or'.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft wing comprising:
a main wing, and
a wing tip device at a tip of the main wing,
wherein the wing tip device includes an upper surface and a lower surface each spanning between a leading edge and a trailing edge of the wing tip device;
wherein the wing tip device has a variation of leading edge droop with respect to unrolled span-wise position such that flow separation on the wing tip device first occurs in an outboard region of the wing tip device,
wherein the leading edge droop, at each unrolled span-wise location of the wing tip device, is characterized by a parameter $Droop_{LE}$ defined as an offset at a leading edge point of the unrolled span-wise location between a local chord line extending through the leading edge point and the trailing edge at the unrolled span-wise location, and a reference line at the unrolled span-wise location extending through the trailing edge and through a reference point mid-way between the upper surface and the lower surface at a reference chord-wise position for the wing tip device, and
wherein a maximum value of the parameter $Droop_{LE}$ for the wing tip device is at least twice a value of the parameter $Droop_{LE}$ at a tip of the wing tip device.

2. The aircraft wing according to claim 1, wherein the variation of leading edge droop is such that the flow separation on the wing tip device first occurs at, or in a region proximal to, a tip of the wing tip device.

3. The aircraft wing according to claim 1, wherein the leading edge droop of the wing tip device is a maximum in the outboard region of the wing tip device.

4. The aircraft wing according to claim 3, wherein the leading edge droop decreases outboard from its a maximum value, towards a tip of the wing tip device.

5. The aircraft wing according to claim 4, wherein the leading edge droop decreases outboard from the maximum value to the tip of the wing tip device.

6. The aircraft wing according to claim 3, wherein the variation of leading edge droop is such that the flow separation moves inboard as an angle of attack of the wing tip device is increased.

7. The aircraft wing according to claim 6, wherein the leading edge droop decreases inboard from the maximum value, towards an inboard end of the wing tip device.

8. The aircraft wing according to claim 1, wherein the wing tip device comprises a transition region extending from an inboard end where, in an inboard direction, the leading edge droop approaches a value of leading edge droop at the tip of the main wing.

9. The aircraft wing according to claim 8, wherein the leading edge droop at an outboard end of the transition region is less than an maximum leading edge droop.

10. The aircraft wing according to claim 1, wherein the wing tip device has increasing dihedral in an outboard direction.

11. The aircraft wing according to claim 1, wherein the wing tip device is swept back.

12. The aircraft wing according to claim 11, wherein the leading edge sweep angle of the wing tip device increases in an outboard direction such that the leading edge is curved when viewed in plan form.

13. The aircraft wing according to claim 1, wherein the wing tip device is a winglet.

14. A wing tip device, for use as the wing tip device in claim 1, wherein the wing tip device has a variation of the leading edge droop with respect to the unrolled span-wise position such that flow separation on the wing tip device first occurs in the outboard region of the wing tip device.

15. An aircraft comprising an aircraft wing according to claim 1.

16. The aircraft wing of claim 1, wherein the outboard region includes a tip of the wing tip device, and the tip is at an outermost span of the wing tip device.

17. The aircraft wing of claim 16, wherein the wing tip device turns gradually upwards from a root of the wing tip device to the tip.

18. An aircraft wing comprising:
a main wing, and
a wing tip device at a tip of the main wing,
wherein the wing tip device includes an upper surface and a lower surface each spanning between a leading edge and a trailing edge of the wing tip device;
wherein the wing tip device has a variation of leading edge droop with respect to unrolled span-wise position such that the leading edge droop of the wing tip device is a maximum in an outboard region of the wing tip device,
wherein the leading edge droop, at each unrolled span-wise location of the wing tip device, is characterized by a parameter $Droop_{LE}$ defined as an offset at a leading edge point of the unrolled span-wise location between a local chord line extending through the leading edge point and the trailing edge at the unrolled span-wise location, and a reference line at the unrolled span-wise location extending through the trailing edge and through a reference point mid-way between the upper surface and the lower surface at a reference chord-wise position for the wing tip device, and
wherein a maximum value of the parameter $Droop_{LE}$ for the wing tip device is at least twice a value of the parameter $Droop_{LE}$ at a tip of the wing tip device.

19. A wing tip device, for use as the wing device in claim 18, wherein the wing tip device has a variation of leading edge droop with respect to unrolled span-wise position such that the leading edge droop of the wing tip device is a maximum in an outboard region of the wing tip device.

20. The aircraft wing of claim 18, wherein the outboard region includes a tip of the wing tip device and the tip is at an outermost span of the wing tip device.

21. The aircraft wing of claim 20, wherein the wing tip device turns gradually upwards from a root of the wing tip device to the tip.

22. A method of making a wing tip device, for use as part of an aircraft wing, wherein the method comprises:
making the wing tip device with a variation of leading edge droop with respect to unrolled span-wise position such that flow separation on the wing tip device first occurs in an outboard region of the wing tip device,
wherein the wing tip device includes an upper surface and a lower surface each spanning between a leading edge and a trailing edge of the wing tip device;
wherein the leading edge droop, at each unrolled span-wise location of the wing tip device, is characterized by a parameter $Droop_{LE}$ defined as an offset at a leading edge point of the unrolled span-wise location between a local chord line extending through the leading edge point and the trailing edge at the unrolled span-wise location, and a reference line at the unrolled span-wise location extending through the trailing edge and through a reference point mid-way between the upper surface and the lower surface at a reference chord-wise position for the wing tip device, and wherein a maximum value of the parameter $Droop_{LE}$ for the wing tip device is at least twice a value of the parameter $Droop_{LE}$ at a tip of the wing tip device.

23. The method of claim 22, wherein the outboard region includes a tip of the wing tip device and the tip is at an outermost span of the wing tip device.

24. The method of claim 23, wherein the wing tip device turns gradually upwards from a root of the wing tip device to the tip.

* * * * *